US010983314B2

(12) United States Patent
Jung

(10) Patent No.: US 10,983,314 B2
(45) Date of Patent: Apr. 20, 2021

(54) IMAGING LENS SYSTEM

(71) Applicant: SAMSUNG ELECTRO-MECHANICS CO., LTD., Suwon-si (KR)

(72) Inventor: Phil Ho Jung, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 89 days.

(21) Appl. No.: 15/442,136

(22) Filed: Feb. 24, 2017

(65) Prior Publication Data
US 2018/0059383 A1 Mar. 1, 2018

(30) Foreign Application Priority Data

Aug. 24, 2016 (KR) .................. 10-2016-0107821

(51) Int. Cl.
G02B 13/18 (2006.01)
G02B 13/00 (2006.01)
G02B 9/62 (2006.01)

(52) U.S. Cl.
CPC .............. *G02B 13/18* (2013.01); *G02B 9/62* (2013.01); *G02B 13/0045* (2013.01)

(58) Field of Classification Search
CPC ....... G02B 13/0045; G02B 9/62; G02B 13/18
USPC ......................................................... 359/758
See application file for complete search history.

(56) References Cited

U.S. PATENT DOCUMENTS 8,599,495 B1* 12/2013 Tsai ................... G02B 13/0045
359/708
8,854,745 B1 10/2014 Chen 2012/0243108 A1 9/2012 Tsai et al.
2014/0092491 A1* 4/2014 Hsu .................... G02B 13/0045
359/761
2014/0111876 A1 4/2014 Tang et al.
2014/0192422 A1 7/2014 Tang et al.
2014/0192423 A1 7/2014 Kondo et al.
2014/0320980 A1 10/2014 Chen
2015/0138431 A1 5/2015 Shin et al.
2016/0124189 A1 5/2016 Park (Continued)

FOREIGN PATENT DOCUMENTS

CN 104122649 A 10/2014
CN 104656232 A 5/2015
KR 10-2016-0050746 A 5/2016

OTHER PUBLICATIONS

Chinese Office Action dated Aug. 14, 2019 in Corresponding Chinese Patent Application No. 201710243152.8 (8 pages in English, 6 pages in Chinese).

(Continued)

*Primary Examiner* — Cara E Rakowski
(74) *Attorney, Agent, or Firm* — NSIP Law

(57) ABSTRACT

An imaging lens system includes a first lens having a positive refractive power, a second lens having a negative refractive power, a third lens having a positive refractive power, a fourth lens having a positive refractive power, a fifth lens having a negative refractive power, and a sixth lens having a positive refractive power. The F number of the system is 2.0 or less. The following Conditional Expression is satisfied: OAL/(Img HT)<1.50. In the expression, OAL represents a distance from an object-side surface of the first lens to an imaging plane, and Img HT represents a half of a diagonal length of the imaging plane.

12 Claims, 9 Drawing Sheets

(56) References Cited

U.S. PATENT DOCUMENTS

2016/0216482 A1* 7/2016 Chen .................. G02B 13/0045
2017/0017064 A1* 1/2017 Jo ...................... G02B 13/0045
2018/0045913 A1* 2/2018 Hsueh .................... G02B 5/005

OTHER PUBLICATIONS

Chinese Office Action dated Jun. 2, 2020 in corresponding Chinese Patent Application No. 201710243152.8. (9 pages in English, 7 pages in Chinese).

* cited by examiner

| F No. = | 1.8 | FIRST EXAMPLE | | | | |
|---|---|---|---|---|---|---|
| FOV = | 79.0 | f = | 4.372 | TTL = | 5.340 | |
| SURFACE NUMBER | | RADIUS OF CURVATURE | THICKNESS/ DISTANCE | INDEX OF REFRACTION | ABBE NUMBER | FOCAL LENGTH |
| S0 | | infinity | | | | |
| S1 | FIRST LENS | 1.6863 | 0.7780 | 1.544 | 56.1 | 3.615 |
| S2 | | 9.6421 | 0.0731 | | | |
| S3 | SECOND LENS | 6.3781 | 0.2500 | 1.650 | 21.5 | -8.503 |
| S4 | | 2.9327 | 0.2668 | | | |
| S5 | THIRD LENS | 10.9633 | 0.5183 | 1.544 | 56.1 | 16.015 |
| S6 | | -42.6764 | 0.4068 | | | |
| S7 | FOURTH LENS | -3.2520 | 0.4258 | 1.650 | 21.5 | 29.921 |
| S8 | | -2.9355 | 0.0978 | | | |
| S9 | FIFTH LENS | -17.7527 | 0.5793 | 1.650 | 21.5 | -7.408 |
| S10 | | 6.7976 | 0.0565 | | | |
| S11 | SIXTH LENS | 1.5634 | 0.7533 | 1.535 | 55.7 | 25.405 |
| S12 | | 1.4688 | 0.2743 | | | |
| S13 | FILTER | Infinity | 0.2100 | 1.517 | 64.2 | |
| S14 | | Infinity | 0.6500 | | | |
| S15 | IMAGING PLANE | Infinity | | | | |

FIG. 3

| F No. = | 2.0 | SECOND EXAMPLE | | | | |
|---|---|---|---|---|---|---|
| FOV = | 81.5 | f = | 4.208 | TTL = | 5.145 | |
| SURFACE NUMBER | | RADIUS OF CURVATURE | THICKNESS/ DISTANCE | INDEX OF REFRACTION | ABBE NUMBER | FOCAL LENGTH |
| S0 | | infinity | | | | |
| S1 | FIRST LENS | 1.7220 | 0.8200 | 1.544 | 56.1 | 3.563 |
| S2 | | 12.3891 | 0.0697 | | | |
| S3 | SECOND LENS | 5.2729 | 0.2500 | 1.650 | 21.5 | -8.931 |
| S4 | | 2.7257 | 0.2234 | | | |
| S5 | THIRD LENS | 9.4373 | 0.4897 | 1.544 | 56.1 | 12.571 |
| S6 | | -24.7916 | 0.3980 | | | |
| S7 | FOURTH LENS | -3.1824 | 0.4000 | 1.650 | 21.5 | 74.453 |
| S8 | | -3.1371 | 0.0400 | | | |
| S9 | FIFTH LENS | -17.5602 | 0.6100 | 1.650 | 21.5 | -7.311 |
| S10 | | 6.7090 | 0.0964 | | | |
| S11 | SIXTH LENS | 1.5841 | 0.7300 | 1.535 | 55.7 | 29.742 |
| S12 | | 1.4757 | 0.3073 | | | |
| S13 | FILTER | Infinity | 0.1100 | 1.517 | 64.2 | |
| S14 | | Infinity | 0.6000 | | | |
| S15 | IMAGING PLANE | Infinity | | | | |

FIG. 6

| F No. = | 1.9 | THIRD EXAMPLE | | | | |
|---|---|---|---|---|---|---|
| FOV = | 79.5 | f = | 4.368 | TTL = | 5.340 | |
| SURFACE NUMBER | | RADIUS OF CURVATURE | THICKNESS/ DISTANCE | INDEX OF REFRACTION | ABBE NUMBER | FOCAL LENGTH |
| S0 | | infinity | | | | |
| S1 | FIRST LENS | 1.6970 | 0.7832 | 1.544 | 56.1 | 3.568 |
| S2 | | 10.9570 | 0.0707 | | | |
| S3 | SECOND LENS | 5.6061 | 0.2500 | 1.650 | 21.5 | -8.600 |
| S4 | | 2.7651 | 0.2524 | | | |
| S5 | THIRD LENS | 9.4084 | 0.5753 | 1.544 | 56.1 | 15.602 |
| S6 | | -89.0253 | 0.3551 | | | |
| S7 | FOURTH LENS | -3.2930 | 0.4977 | 1.650 | 21.5 | 38.436 |
| S8 | | -3.0880 | 0.0738 | | | |
| S9 | FIFTH LENS | -17.8382 | 0.5205 | 1.650 | 21.5 | -7.493 |
| S10 | | 6.8838 | 0.0724 | | | |
| S11 | SIXTH LENS | 1.6159 | 0.7627 | 1.535 | 55.7 | 26.805 |
| S12 | | 1.5204 | 0.2663 | | | |
| S13 | FILTER | Infinity | 0.2100 | 1.517 | 64.2 | |
| S14 | | Infinity | 0.6500 | | | |
| S15 | IMAGING PLANE | Infinity | | | | |

FIG. 9

IMAGING LENS SYSTEM

CROSS-REFERENCE TO RELATED APPLICATION(S)

This application claims the benefit under 35 U.S.C. §119(a) of Korean Patent Application No. 10-2016-0107821, filed on Aug. 24, 2016 in the Korean Intellectual Property Office, the entire disclosure of which is incorporated herein by reference for all purposes.

BACKGROUND

1. Field

The following description relates to an imaging lens system including six lenses.

2. Description of Related Art

Optical devices, mounted in cameras of mobile terminals, include a plurality of lenses. For example, imaging lens systems have six lenses for high-resolution imaging lens systems.

However, when such lenses are configured for high-resolution imaging lens systems, the length of the high-resolution imaging lens systems (a distance from an object-side surface of a first lens of the lenses to an imaging plane) may be increased. In this case, it may be difficult to mount imaging lens systems in thin mobile terminals. Thus, there is a need for imaging lens systems that can be reduced in length.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an imaging lens system includes a first lens having a positive refractive power, a second lens having a negative refractive power, a third lens having a positive refractive power, a fourth lens having a positive refractive power, a fifth lens having a negative refractive power, and a sixth lens having a positive refractive power, in which an F No. of the imaging lens system is 2.0 or less.

The first lens of the imaging lens system may have a concave image-side surface along an optical axis. The third lens can have a convex object-side surface or image-side surface along the optical axis. The fourth lens may have a concave object-side surface along the optical axis. The fifth lens may have a concave object-side surface or image-side surface along the optical axis.

The imaging lens system may satisfy the conditional expression $0.1<f/f3<0.5$, where f represents an overall focal length of the imaging lens system and f3 represents a focal length of the third lens. The imaging lens system can satisfy the conditional expression $1.6<Nd5<2.1$, where Nd represents a refractive index of the fifth lens. The imaging lens system may satisfy the conditional expression $2.5<OAL/(F No.)$, where OAL represents a distance from the object-side surface of the first lens to the imaging plane.

In another general aspect, an imaging lens system includes a first lens, a second lens, a third lens, a fourth lens, a fifth lens, and a sixth lens, sequentially disposed from an object. The third lens, the fourth lens, and the sixth lens each have a same refractive power as a refractive power of the first lens. The second lens and the fifth lens each have a different refractive power from the refractive power of the first lens. The imaging lens system satisfies the conditional expression F No.$<2.0$. The imaging lens system satisfies the conditional expression OAL/(Img HT)$<1.50$, where OAL represents a distance from an object-side surface of the first lens to an imaging plane, and Img HT represents a half of a diagonal length of the imaging plane.

The third lens of the imaging lens system may have a convex object-side surface along an optical axis. The fifth lens of the imaging lens system can have a concave image-side surface along the optical axis.

In another general aspect, an imaging lens system includes a first lens, a second lens having a convex object-side surface along an optical axis, a third lens, a fourth lens, a fifth lens, and a sixth lens having a convex object-side surface along the optical axis.

The first lens of the imaging lens system may have a convex object-side surface along an optical axis. The second lens of the imaging lens system can have a concave image-side surface along an optical axis. The fourth lens of the imaging lens system may have a convex image-side surface along an optical axis. The sixth lens of the imaging lens system can have a concave image-side surface along an optical axis. The imaging lens system may have a first lens with a concave image-side surface along an optical axis, a third lens with a convex image-side surface along the optical axis, and a fifth lens with a concave object-side surface along the optical axis.

The imaging lens system may satisfy the conditional expression $20<V1-V2<40$, where V1 represents an Abbe number of the first lens and V2 represents an Abbe number of the second lens. The imaging lens system may satisfy the conditional expression $0.5<OAL/f<2.0$, where f represents an overall focal length of the imaging lens system.

BRIEF DESCRIPTION OF THE DRAWINGS

FIG. 3 is a table listing characteristics of lenses illustrated in FIG. 1.

FIG. 6 is a table listing characteristics of lenses illustrated in FIG. 4.

FIG. 9 is a table listing characteristics of lenses illustrated in FIG. 7.

Figure 1:
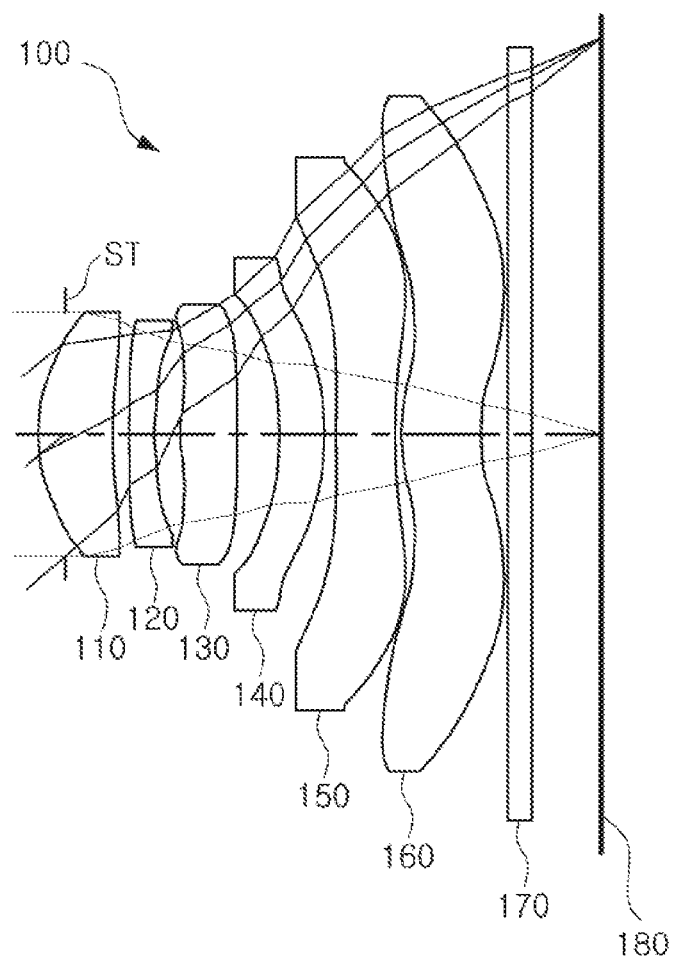
FIG. 1 is a view of an imaging lens system according to a first example.

Throughout the drawings and the detailed description, the same reference numerals refer to the same elements where applicable. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed, as will be apparent after an understanding of the disclosure of this application, with the exception of operations necessarily occurring in a certain order. Also, descriptions of functions and constructions that are well known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various components, regions, or sections, these components, regions, or sections are not to be limited by these terms. Rather, these terms are only used to distinguish one component, region, or section from another component, region, or section. Thus, a first component, region, or section referred to in examples described herein may also be referred to as a second component, region, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Examples provide an imaging lens system capable of implementing high resolution. Subsequently, examples are described in further detail with reference to the accompanying drawings.

In the present specification, a first lens refers to a lens closest to an object (or a subject) from which an image is captured. A sixth lens refers to a lens closest to an imaging plane (or an image sensor). Further, in an embodiment, all radii of curvature, thicknesses, optical axis distances from a first surface of the first lens to the image sensor (OALs), a distance on an optical axis between a stop and the imaging plane (SLs), image heights (IMG HTs) (a half of a diagonal length of the imaging plane), and back focus lengths (BFLs) of the lenses, an overall focal length of an imaging lens system, and a focal length of each lens are indicated in millimeters (mm). A person skilled in the relevant art will appreciate that other units of measurement may be used. Further, in embodiments, all radii of curvature, thicknesses, OALs (optical axis distances from the first surface of the first lens to the image sensor), a distance on the optical axis between the stop and the image sensor (SLs), image heights (IMGHs) (image heights), and back focus lengths (BFLs) of the lenses, an overall focal length of an optical system, and a focal length of each lens are indicated in millimeters (mm). Further, thicknesses of lenses, gaps between the lenses, OALs, TLs, SLs are distances measured based on an optical axis of the lenses.

A surface of a lens being convex means that an optical axis portion of a corresponding surface is convex, and a surface of a lens being concave means that an optical axis portion of a corresponding surface is concave. Therefore, in a configuration in which one surface of a lens is described as being convex, an edge portion of the lens may be concave. Likewise, in a configuration in which one surface of a lens is described as being concave, an edge portion of the lens may be convex. In other words, a paraxial region of a lens may be convex, while the remaining portion of the lens outside the paraxial region is either convex, concave, or flat. Further, a paraxial region of a lens may be concave, while the remaining portion of the lens outside the paraxial region is either convex, concave, or flat. In addition, in an embodiment, thicknesses and radii of curvatures of lenses are measured in relation to optical axes of the corresponding lenses.

In accordance with illustrative examples, the embodiments described of the optical system include six lenses with a refractive power. However, the number of lenses in the optical system may vary, for example, between two to six lenses, while achieving the various results and benefits described below. Also, although each lens is described with a particular refractive power, a different refractive power for at least one of the lenses may be used to achieve the intended result.

An imaging lens system includes six lenses. As an example, the imaging lens system may include a first lens, a second lens, a third lens, a fourth lens, a fifth lens, and a sixth lens, sequentially disposed from an object side.

The first lens has a refractive power. For example, the first lens has a positive refractive power. One surface of the first lens is concave. In an embodiment, an image-side surface of the first lens is concave.

The first lens may have an aspherical surface. As an example, both surfaces of the first lens may be aspherical. The first lens may be formed of a material having high light transmissivity and excellent workability. For example, the first lens is formed of plastic. However, a material of the first lens is not limited to plastic. In another example, the first lens may be formed of glass. The first lens has a predetermined refractive index. In an embodiment, a refractive index of the first lens is less than 1.6.

The second lens has a refractive power. For example, the second lens has a negative refractive power. One surface of the second lens may be convex. In an embodiment, an object-side surface of the second lens may be convex.

The second lens may have an aspherical surface. As an example, an object-side surface of the second lens may be aspherical. The second lens may be formed of a material having high light transmissivity and excellent workability. For example, the second lens is formed of plastic. However, a material of the second lens is not limited to plastic. In another example, the second lens may be formed of glass.

The second lens has a refractive index higher than that of the first lens. In an embodiment, a refractive index of the second lens is 1.6 or more.

The third lens has a refractive power. For example, the third lens has a positive refractive power. At least one surface of the third lens may be convex. In an embodiment, both surfaces of the third lens are convex.

The third lens may have an aspherical surface. As an example, an image-side surface of the third lens is aspherical. The third lens may be formed of a material having high light transmissivity and excellent workability. For example, the third lens is formed of plastic. However, a material of the third lens is not limited to plastic. In another example, the third lens may be formed of glass. The third lens has substantially the same refractive index as the first lens. In an embodiment, a refractive index of the third lens is less than 1.6.

The fourth lens has a refractive power. For example, the fourth lens has a positive refractive power. One surface of the fourth lens may be concave. In an embodiment, an object-side surface of the fourth lens is concave.

The fourth lens may have an aspherical surface. As an example, both surfaces of the fourth lens are aspherical. The fourth lens may be formed of a material having high light transmissivity and excellent workability. For example, the fourth lens is formed of plastic. However, a material of the fourth lens is not limited to plastic. In another example, the fourth lens may be formed of glass. The fourth lens has a refractive index higher than that of the first lens. In an embodiment, a refractive index of the fourth lens is 1.6 or more.

The fifth lens has a refractive power. For example, the fifth lens has a negative refractive power. At least one surface of the fifth lens may be concave. In an embodiment, both surfaces of the fifth lens are concave.

The fifth lens may have an aspherical surface. As an example, both surfaces of the fifth lens may be aspherical. The fifth lens may be formed of a material having high light transmissivity and excellent workability. For example, the fifth lens is formed of plastic. However, a material of the fifth lens is not limited to plastic. In another example, the fifth lens may be formed of glass. The fifth lens has a refractive index higher than that of the first lens. In an embodiment, a refractive index of the fifth lens is 1.6 or more.

The sixth lens has a refractive power. For example, the sixth lens has a positive refractive power. One surface of the sixth lens is convex. In an embodiment, an object-side surface of the sixth lens may be convex. The sixth lens may have inflection points. As an example, at least one inflection point is formed on both surfaces of the sixth lens.

The sixth lens may have an aspherical surface. As an example, both surfaces of the sixth lens are aspherical. The sixth lens is formed of a material having high light transmissivity and excellent workability. For example, the sixth lens is formed of plastic. However, a material of the sixth lens is not limited to plastic. In another example, the sixth lens may be formed of glass. The sixth lens has substantially the same refractive index as the first lens. In an embodiment, a refractive index of the sixth lens is less than 1.6.

The aspherical surfaces of the first to sixth lenses may be represented by the following Equation 1:

$$z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20} \quad \text{[Equation 1]}$$

In the equation, c represents an inverse of a radius of curvature of the lens, k represents a conic constant, r represents a distance from a certain point on an aspherical surface of the lens to an optical axis, A to J represent aspherical constants, and Z (or SAG) represents a distance between the certain point on the aspherical surface of the lens at the distance r and a tangential plane meeting an apex of the aspherical surface of the lens.

The imaging lens system may further include a filter, an image sensor, and a stop. The filter is disposed between the sixth lens and the image sensor. The filter blocks light having a wavelength, and a improving image clarity. For example, the filter blocks infrared wavelength light.

The image sensor forms the imaging plane. For example, a surface of the image sensor forms the imaging plane. The stop adjusts an amount of light incident to lenses. For example, the stop is disposed from the object side of the first lens or between the first lens and the second lens.

The imaging lens system satisfies any one of or any combination of any two or more of the following Conditional Expressions:

| | |
|---|---|
| $0.1 < f/f3 < 0.5$ | [Conditional Expression 1] |
| $20 < V1-V2 < 40$ | [Conditional Expression 2] |
| $0.5 < OAL/f < 2.0$ | [Conditional Expression 3] |
| $1.60 < Nd5 < 2.10$ | [Conditional Expression 4] |
| $2.5 < OAL/(F\ No.)$ | [Conditional Expression 5] |
| $OAL/(IMG\ HT) < 1.5$ | [Conditional Expression 6] |

In the Conditional Expressions 1 to 3, OAL represents a distance from the object-side surface of the first lens to the imaging plane, f represents an overall focal length of the imaging lens system, f3 represents a focal length of the third lens, V1 represents an Abbe number of the first lens, and V2 represents an Abbe number of the second lens. In the Conditional expressions 4 to 6, Nd5 represents a refractive index of the fifth lens, and IMG HT represents a half of a diagonal length of the imaging plane.

Conditional Expression 1 defines the magnitude of the refractive power of the third lens. For example, when the refractive power of the third lens exceeds an upper limit of Conditional Expression 1, the refractive power of the third lens is strong and the distortion aberration becomes large. When the refractive power of the third lens exceeds a lower limit of Conditional Expression 1, the refractive power of the third lens is small, and it may be difficult to achieve a desired resolution of the imaging lens system.

Conditional Expression 2 improves chromatic aberration and reduces manufacturing costs of the imaging lens system. For example, when the refractive power of the second lens exceeds an upper limit of Conditional Expression 2, the manufacturing costs may increase, and when the refractive powers of the first and second lenses exceed a lower limit of Conditional Expression 2, it may be difficult to compensate for chromatic aberrations, thereby making it difficult to provide a high-resolution imaging lens system.

Conditional Expression 3 makes an imaging lens system compact. For example, when refractive power of the imaging lens system exceeds an upper limit of Conditional Expression 3, it may be difficult to make the imaging lens system compact, and when refractive power of the imaging lens system exceeds a lower limit of the Conditional Expression 3, the field of view of the imaging lens system may not be sufficient.

Condition Expression 4 improves chromatic aberrations. For example, when the refractive power of the fifth lens exceeds an upper limit of Conditional Expression 4, the manufacturing costs of the imaging lens system may be increased, and when the refractive power of the fifth lens exceeds a lower limit of Conditional Expression 4, it may be difficult to compensate for chromatic aberrations, and making it difficult to achieve a high-resolution imaging lens system.

An imaging lens system, according to various examples, will now be described. Referring to FIG. 1, an imaging lens system, according to a first example, is described. An imaging lens system 100, according to the first example, includes an optical system including a first lens 110, a second lens 120, a third lens 130, a fourth lens 140, a fifth lens 150, and a sixth lens 160.

The first lens 110 has a positive refractive power. An object-side surface of lens 110 is convex and an image-side surface of lens 110 is concave. The second lens 120 has a negative refractive power. An object-side surface of lens 120 is convex and an image-side surface of lens 120 is concave. The third lens 130 has a positive refractive power. Both of an object-side surface and an image-side surface of lens 130 are convex.

The fourth lens 140 has a positive refractive power. An object-side surface of lens 140 is concave and an image-side surface of lens 140 is convex. The fifth lens 150 has a negative refractive power. Both of an object-side surface and an image-side surface of lens 150 are concave. The sixth lens 160 has a positive refractive power. An object-side surface of lens 160 is convex and an image-side surface of lens 160 is concave. In addition, sixth lens 160 has inflection points formed on both its object-side surface and image-side surface.

Imaging lens system 100 further includes a filter 170, an image sensor 180, and a stop ST. Filter 170 is disposed between sixth lens 160 and image sensor 180. Stop ST is disposed from the object-side surface of the first lens 110.

Figure 2:
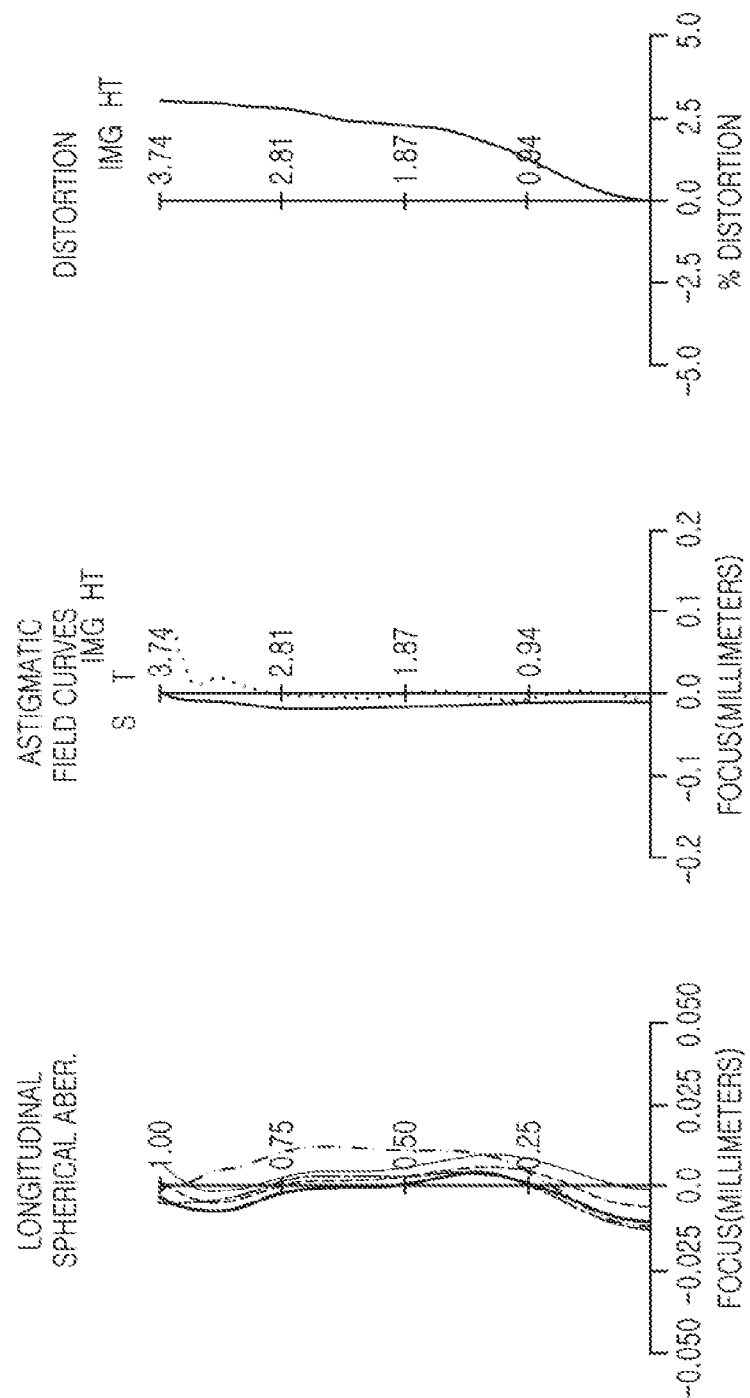
FIG. 2 are graphs representing aberration characteristics of the imaging lens system illustrated in FIG. 1.

Imaging lens system 100, configured as described above, yields aberration characteristics, as illustrated by the graphs in FIG. 2. FIG. 3 is a table listing characteristics of lenses of imaging lens system 100, according to the first example.

Figure 4:
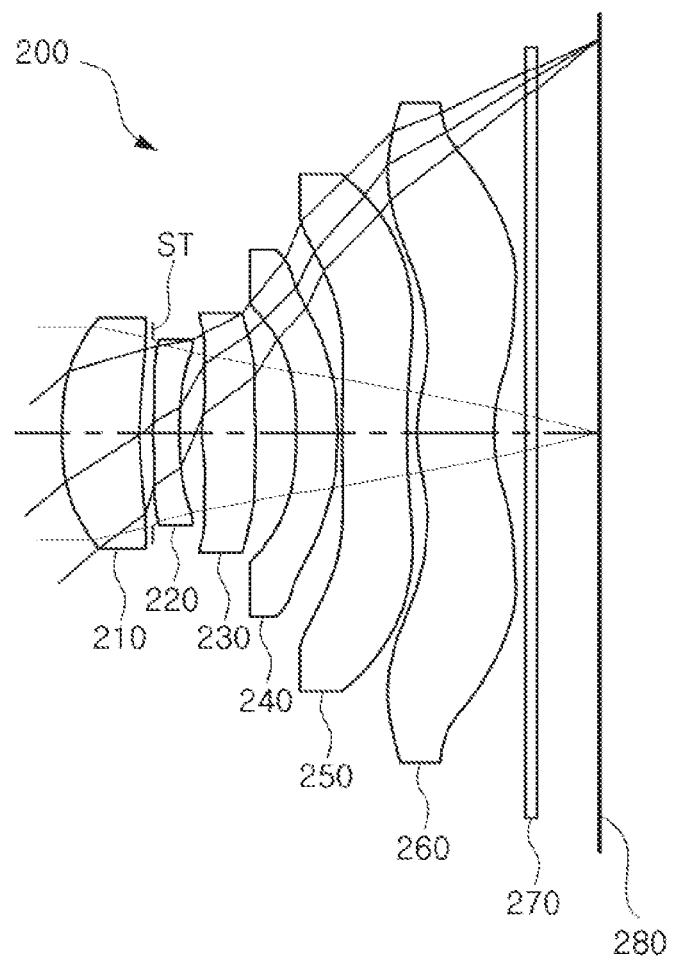
FIG. 4 is a view of an imaging lens system according to a second example.

Referring to FIG. 4, an imaging lens system, according to a second example, is described. An imaging lens system 200, according to the second example, includes an optical system including a first lens 210, a second lens 220, a third lens 230, a fourth lens 240, a fifth lens 250, and a sixth lens 260.

The first lens 210 has a positive refractive power. An object-side surface of lens 210 is convex and an image-side surface of lens 210 is concave. The second lens 220 has a negative refractive power. An object-side surface of lens 220 is convex and an image-side surface of lens 220 is concave. The third lens 230 has a positive refractive power. Both of an object-side surface and an image-side surface of lens 230 are convex.

The fourth lens 240 has a positive refractive power. An object-side surface of lens 240 is concave and an image-side surface of lens 240 is convex. The fifth lens 250 has a negative refractive power. Both of an object-side surface and an image-side surface of lens 250 are concave. The sixth lens 260 has a positive refractive power. An object-side surface of lens 260 is convex and an image-side surface of lens 260 is concave. In addition, sixth lens 260 has inflection points formed on both its object-side surface and image-side surface.

Imaging lens system 200 further includes a filter 270, an image sensor 280, and a stop ST. Filter 270 is disposed between sixth lens 260 and image sensor 280. Stop ST is disposed between the first and second lenses 210 and 220.

Figure 5:
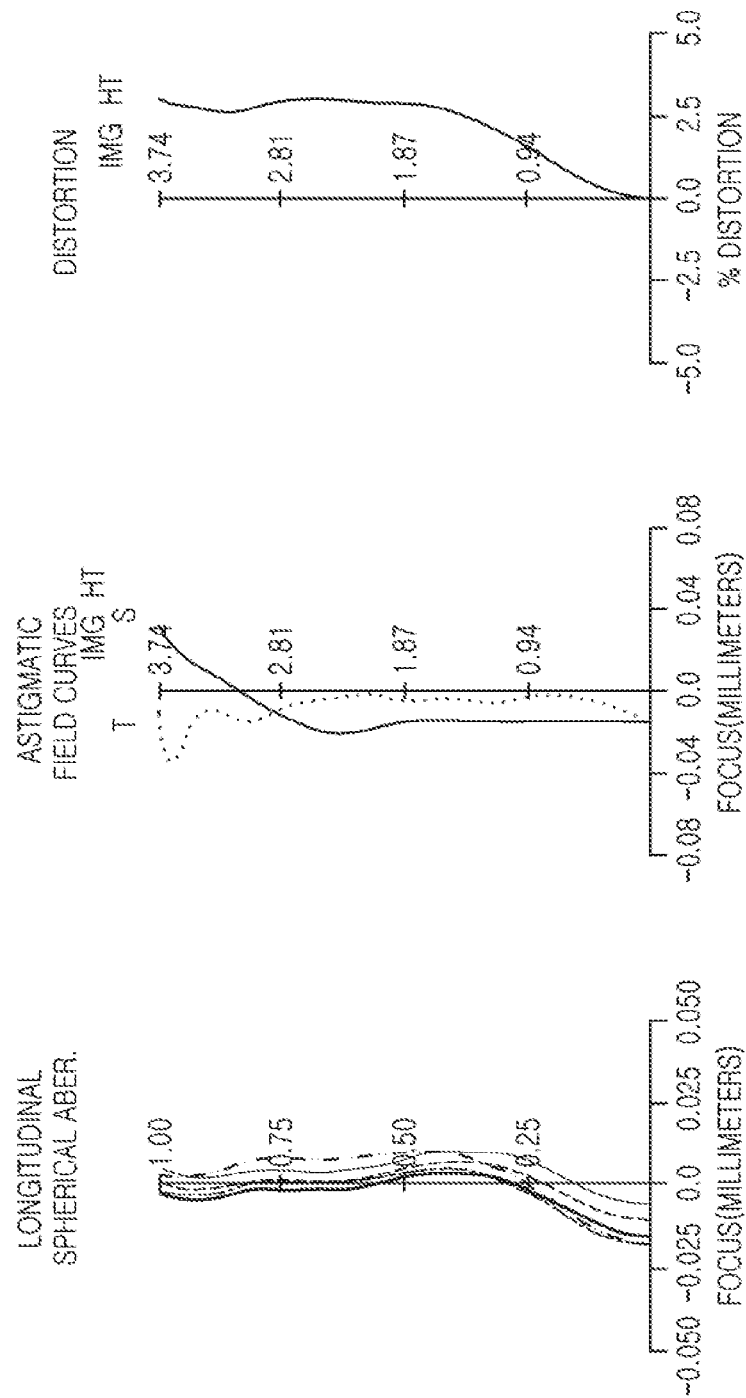
FIG. 5 are graphs representing aberration characteristics of the imaging lens system illustrated in FIG. 4.

Imaging lens system 200, configured as described above, yields aberration characteristics as illustrated by the graphs in FIG. 5. FIG. 6 is a table listing characteristics of lenses of imaging lens system 200, according to the second example.

Figure 7:
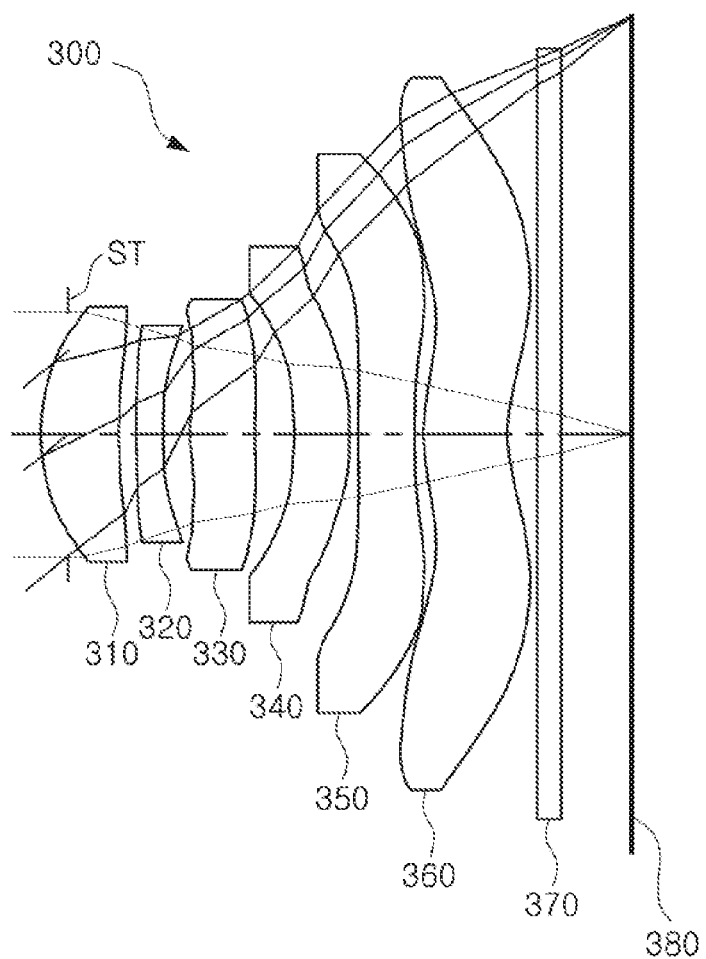
FIG. 7 is a view of an imaging lens system according to a third example.

Referring to FIG. 7, an imaging lens system, according to a third example, is described. An imaging lens system 300, according to the third example, includes an optical system including a first lens 310, a second lens 320, a third lens 330, a fourth lens 340, a fifth lens 350, and a sixth lens 360.

The first lens 310 has a positive refractive power. An object-side surface of lens 310 is convex and an image-side surface of lens 310 is concave. The second lens 320 has a negative refractive power. An object-side surface of lens 320 is convex and an image-side surface of lens 320 is concave. The third lens 330 has a positive refractive power. Both of an object-side surface and an image-side surface of lens 330 are convex.

The fourth lens 340 has a positive refractive power. An object-side surface of lens 340 is concave and an image-side surface of lens 340 is convex. The fifth lens 350 has a negative refractive power. Both of an object-side surface and an image-side surface of lens 350 are concave. The sixth lens 360 has a positive refractive power. An object-side surface of lens 360 is convex and an image-side surface of lens 360 is concave. In addition, sixth lens 360 has inflection points formed on both its object-side surface and the image-side surface.

Imaging lens system 300 further includes a filter 370, an image sensor 380, and a stop ST. Filter 370 is disposed between sixth lens 360 and image sensor 380. Stop ST is disposed from the object-side surface of first lens 310.

Figure 8:
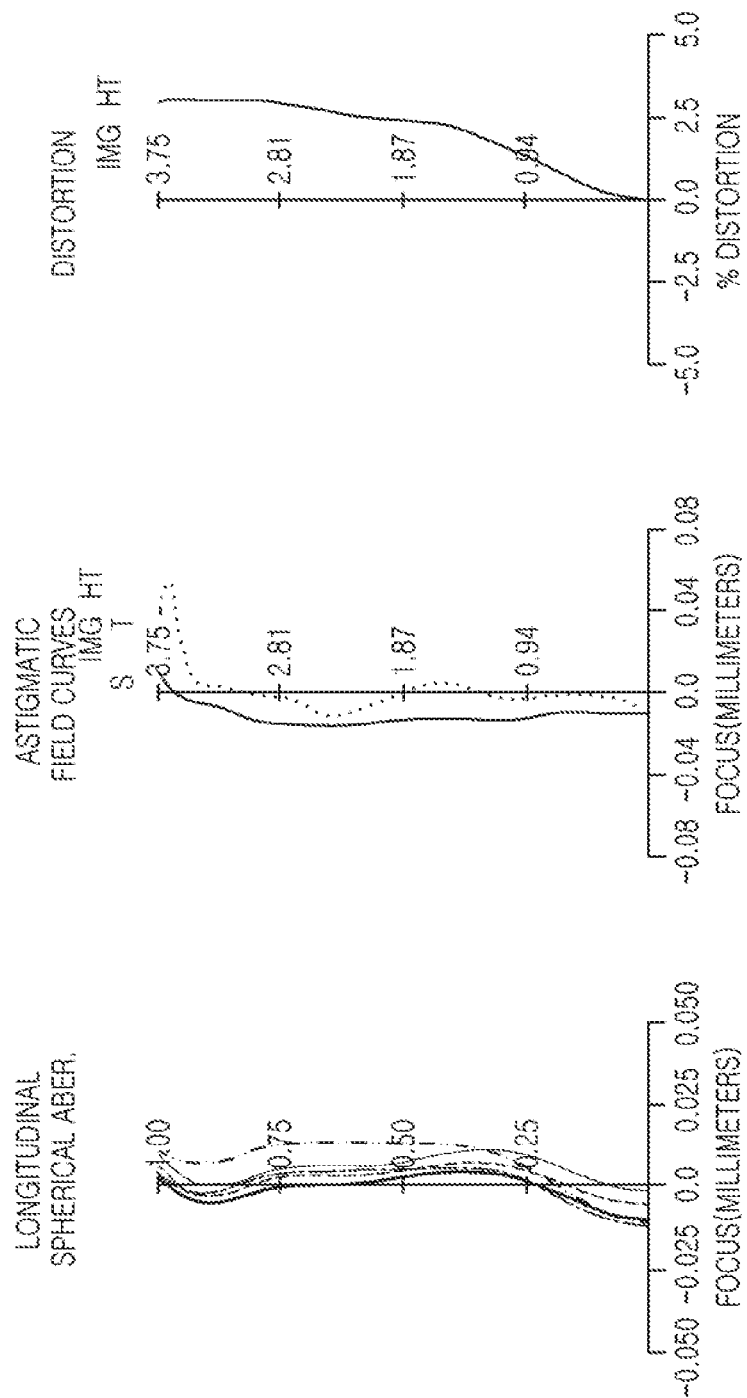
FIG. 8 are graphs representing aberration characteristics of the imaging lens system illustrated in FIG. 7.

Imaging lens system 300, configured as described above, yields aberration characteristics, as illustrated by the graphs in FIG. 8. FIG. 9 is a table listing characteristics of lenses of imaging lens system 300, according to the third example. Table 1 represents values of Conditional Expressions 1 to 6 of imaging lens systems 100, 200, and 300, according to the first to third examples.

TABLE 1

| Conditional Expression | First Example | Second Example | Third Example |
| --- | --- | --- | --- |
| f/f3 | 0.273 | 0.335 | 0.280 |
| V1-V2 | 34.600 | 34.600 | 34.600 |
| OAL/f | 1.221 | 1.223 | 1.223 |
| Nd5 | 1.650 | 1.650 | 1.650 |
| OAL/(F No.) | 2.967 | 2.572 | 2.811 |
| OAL/(Img HT) | 1.428 | 1.376 | 1.428 |

As illustrated in Table 1, imaging lens systems 100, 200, and 300, according to the first to third examples, satisfy the numerical ranges defined in Conditional Expressions 1 to 6. As set forth above, according to the examples described, a high-resolution imaging lens system is implemented.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An imaging lens system comprising:
   a first lens comprising a positive refractive power;
   a second lens comprising a negative refractive power;
   a third lens comprising a positive refractive power;
   a fourth lens comprising a positive refractive power;
   a fifth lens comprising a negative refractive power; and
   a sixth lens comprising a positive refractive power and an inflection point formed on an image-side surface thereof,
   wherein the first lens, the second lens, the third lens, the fourth lens, the fifth lens, and the sixth lens are sequentially disposed from an object to an image side,
   wherein an F number of the imaging lens system is less than 2.0, and
   wherein $1.376 \leq OAL/(Img\ HT) < 1.50$,
   where OAL represents a distance from an object-side surface of the first lens to an imaging plane, and Img HT represents a half of a diagonal length of the imaging plane.

2. The imaging lens system of claim 1, wherein the first lens has a concave image-side surface along an optical axis.

3. The imaging lens system of claim 1, wherein the third lens has a convex object-side surface along an optical axis.

4. The imaging lens system of claim 1, wherein the third lens has a convex image-side surface along an optical axis.

5. The imaging lens system of claim 1, wherein the fourth lens has a concave object-side surface along an optical axis.

6. The imaging lens system of claim 1, wherein the fifth lens has a concave object-side surface along an optical axis.

7. The imaging lens system of claim 1, wherein the fifth lens has a concave image-side surface along an optical axis.

8. The imaging lens system of claim 1, wherein $0.1 < f/f3 < 0.5$, where f represents an overall focal length of the imaging lens system, and f3 represents a focal length of the third lens.

9. The imaging lens system of claim 1, wherein $1.6 < Nd5 < 2.1$, where Nd5 is a refractive index of the fifth lens.

10. An imaging lens system comprising:
    a first lens, a second lens, a third lens, a fourth lens, a fifth lens, and a sixth lens, sequentially disposed from an object to an image side,
    wherein the third lens, the fourth lens, and the sixth lens each have a same refractive power as a refractive power of the first lens, and the second lens and the fifth lens each have a different refractive power from the refractive power of the first lens,
    wherein an F number of the imaging lens system is less than 2.0, and
    wherein $1.376 \leq OAL/(Img\ HT) < 1.50$,
    where OAL represents a distance from an object-side surface of the first lens to an imaging plane, and Img HT represents a half of a diagonal length of the imaging plane.

11. The imaging lens system of claim 10, wherein the third lens has a convex object-side surface along an optical axis, and the fifth lens has a concave image-side surface along the optical axis.

12. An imaging lens system comprising:
    a first lens comprising a positive refractive power;
    a second lens comprising a negative refractive power;
    a third lens comprising a positive refractive power;
    a fourth lens comprising a positive refractive power;
    a fifth lens comprising a negative refractive power and having a concave object-side surface; and
    a sixth lens comprising a positive refractive power and an inflection point formed on an image-side surface thereof,
    wherein the first lens, the second lens, the third lens, the fourth lens, the fifth lens, and the sixth lens are sequentially disposed from an object to an image side, and
    wherein an F number of the imaging lens system is less than or equal to 1.8, and
    wherein $2.5 < OAL/(F\ number) \leq 2.967$,
    where OAL represents a distance from an object-side surface of the first lens to an imaging plane, and Img HT represents a half of a diagonal length of the imaging plane.

* * * * *